United States Patent
Horiguchi et al.

(10) Patent No.: US 6,370,322 B2
(45) Date of Patent: *Apr. 9, 2002

(54) DATA DECODING SYSTEM, DATA DECODING METHOD, TRANSMISSION METHOD, TRANSMISSION DEVICE, RECEIVING DEVICE, AND RECEIVING METHOD

(75) Inventors: Mari Horiguchi, Kanagawa; Harumi Kawamura, Tokyo; Naofumi Yanagihara, Tokyo; Makoto Sato, Tokyo; Ichiro Hamada; Takehiko Nakano, both of Kanagawa, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/926,416

(22) Filed: Sep. 9, 1997

(30) Foreign Application Priority Data

Sep. 10, 1996 (JP) ................................ 8-238761
Jun. 3, 1997 (JP) ............................... 9-144940

(51) Int. Cl.$^7$ ................................ H04N 5/91
(52) U.S. Cl. ..................... 386/95; 386/125; 386/46
(58) Field of Search ................ 386/1, 45–46, 386/52, 125, 126, 124, 95; 348/705, 15, 14; 370/395, 512; H04N 5/91, 5/765

(56) References Cited

U.S. PATENT DOCUMENTS

| | | | | |
|---|---|---|---|---|
| 5,535,208 A | * | 7/1996 | Kawakami et al. | 370/84 |
| 5,613,032 A | * | 3/1997 | Cruz et al. | 386/69 |
| 5,640,392 A | * | 6/1997 | Hayashi | 370/395 |
| 5,710,773 A | * | 1/1998 | Shiga | 370/512 |
| 5,764,277 A | * | 6/1998 | Loui et al. | 348/14 |
| 5,787,259 A | * | 7/1998 | Haroun et al. | 395/200.83 |
| 5,835,129 A | * | 11/1998 | Kumar | 348/15 |
| 5,859,663 A | * | 1/1999 | Simon | 348/15 |
| 5,883,621 A | * | 3/1999 | Iwamura | 345/327 |
| 5,896,128 A | * | 4/1999 | Boyer | 348/15 |
| 5,933,430 A | * | 8/1999 | Osakabe et al. | 370/395 |

* cited by examiner

Primary Examiner—Vincent F. Boccio
(74) Attorney, Agent, or Firm—Frommer Lawrence & Haug LLP; William S. Frommer; Gordon Kessler

(57) ABSTRACT

The encoded data outputted from a DVD player 1 are outputted to and decoded in the decoders 4-1 to 4-3 of digital television receivers 3-1 to 3-3 through an AV bus 5 comprising the IEEE 1394. When a command for changing a system parameter is inputted to any one of the decoders 4-1 to 4-3, the command corresponding to the change is supplied to the DVD player 1 through the AV bus 5. The DVD player 1 changes the system parameter in response to the command and outputs the system parameter to the respective decoders 4-1 to 4-3 through the AV bus 5. Thereby, the system parameter is changed not only in the DVD player but also in other components.

29 Claims, 17 Drawing Sheets

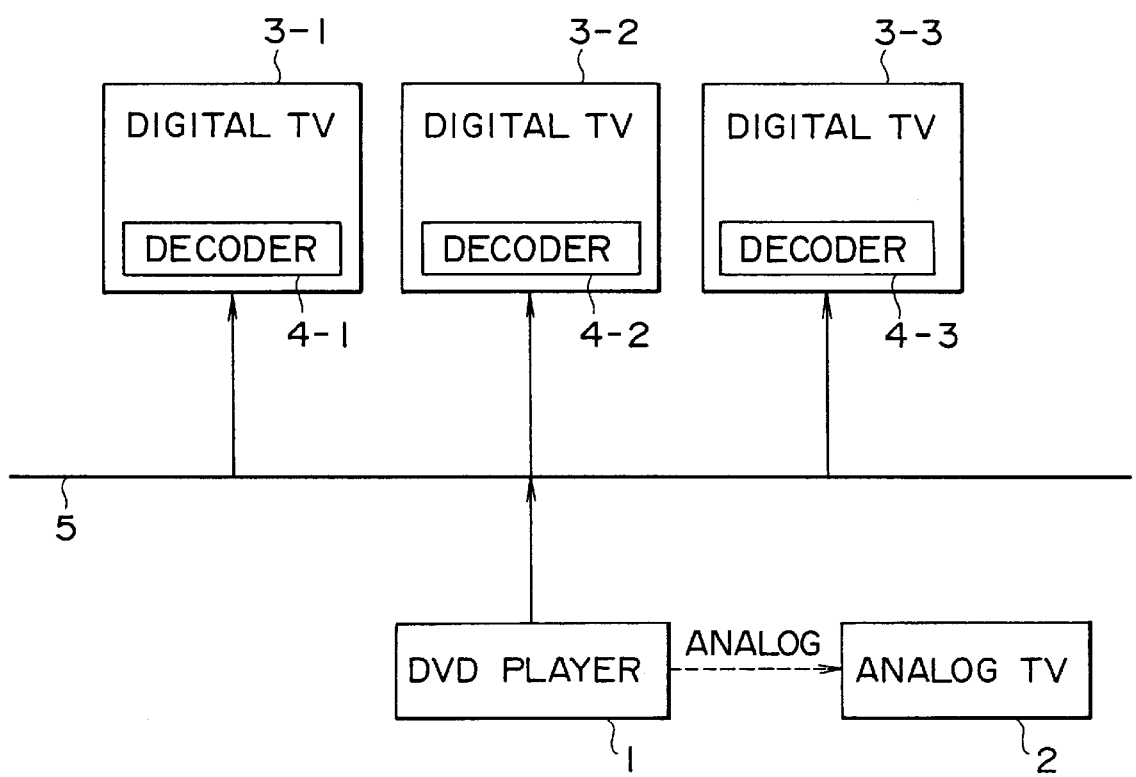

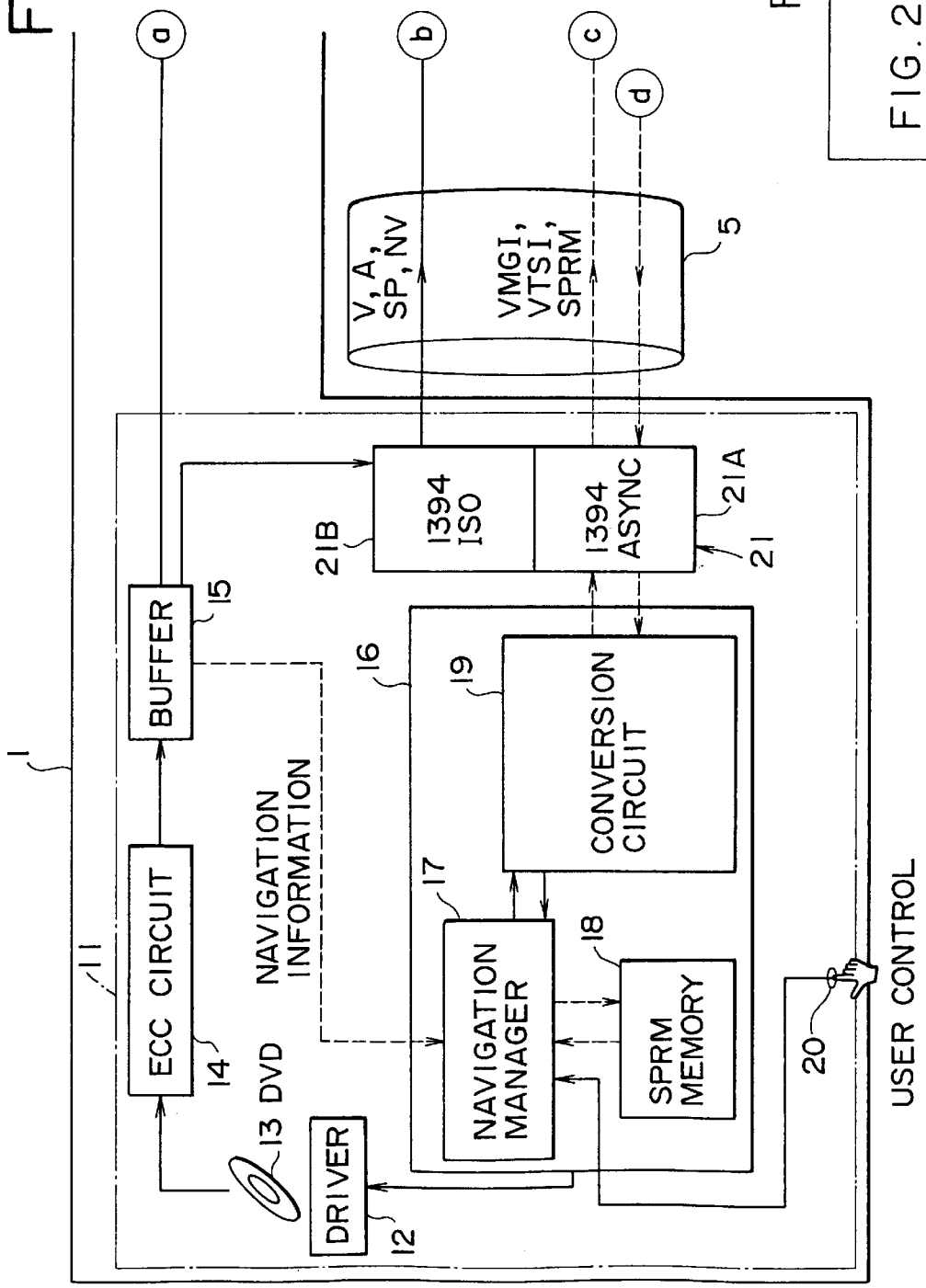

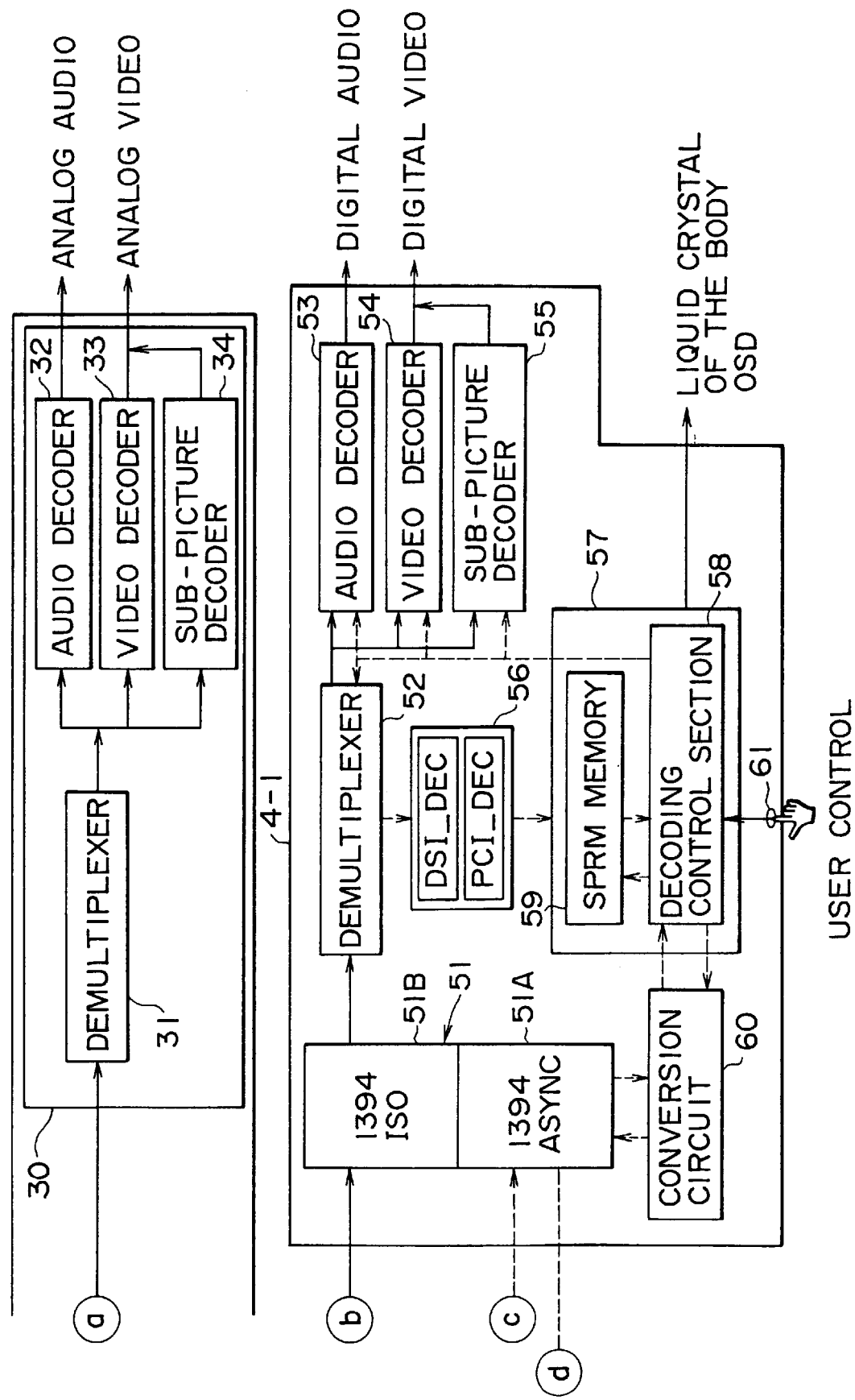

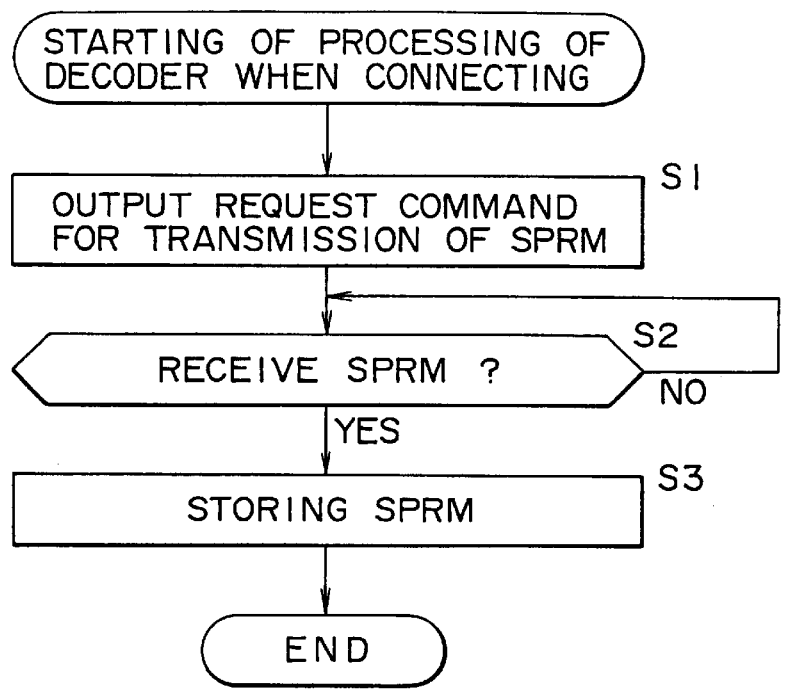
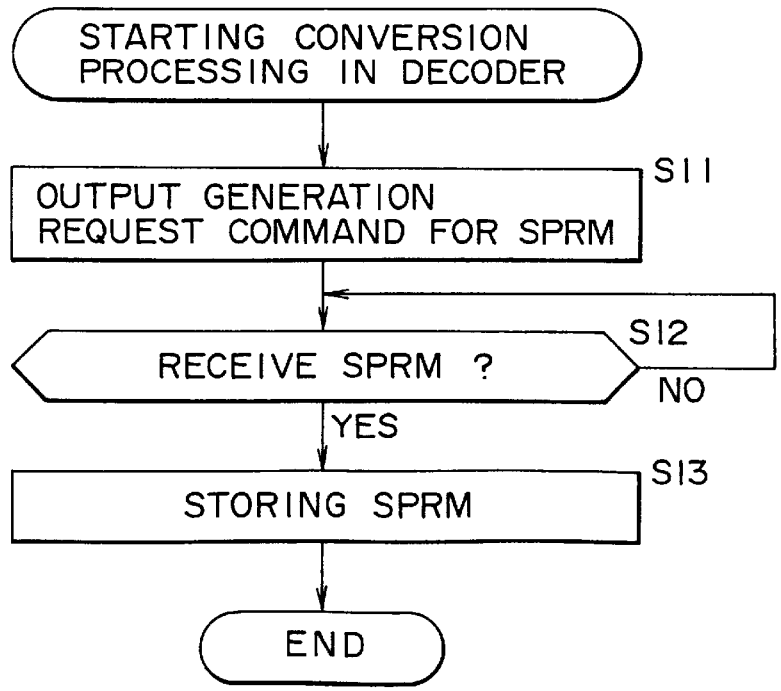

STRUCTURE OF ASYNCHRONOUS COMMAND AND RESPONSE PACKET

FIG. 9A COMMAND FORMAT

| CTS | CT/RC | HA | OPC | OPR | OPR | OPR |
|---|---|---|---|---|---|---|
| "o"h | TYPE OF REQUEST | ADDRESSER IN APPARATUS | COMMAND | PARAMETER 1 | PARAMETER 2 | PARAMETER 3 |

FIG. 9B RESPONSE FORMAT

| CTS | CT/RC | HA | OPC | OPR | OPR | OPR |
|---|---|---|---|---|---|---|
| "o"h | TYPE OF RESPONSE | ADDRESSEE IN APPARATUS | COMMAND SUBJECTED TO PROCESSING | PARAMETER 1 | PARAMETER 2 | PARAMETER 3 |

FIG. 10

| b15 | b14 | b13 | b12 | b11 | b10 | b9 | b8 |
|---|---|---|---|---|---|---|---|
| RESERVED ||||||||

| b7 | b6 | b5 | b4 | b3 | b2 | b1 | b0 |
|---|---|---|---|---|---|---|---|
| RESERVED ||| AUDIO STREAM NUMBER ||||

FIG. 11

| b15 | b14 | b13 | b12 | b11 | b10 | b9 | b8 |
|---|---|---|---|---|---|---|---|
| RESERVED ||||||| HIGHLIGHT |
| (cont.) |||||| RESERVED | BUTTON |

| b7 | b6 | b5 | b4 | b3 | b2 | b1 | b0 |
|---|---|---|---|---|---|---|---|
| HIGHLIGHT BUTTON NUMBER ||| RESERVED |||||

FIG. 12

| b15 | b14 | b13 | b12 | b11 | b10 | b9 | b8 |
|---|---|---|---|---|---|---|---|
| RESERVED ||||||||

| b7 | b6 | b5 | b4 | b3 | b2 | b1 | b0 |
|---|---|---|---|---|---|---|---|
| RESERVED | SP_disp_flag | SPSTN ||||||

ISOCHRONOUS COMMUNICATION

FIG. 14

| SPRM | MEANING |
|------|---------|
| 0 | MENU DESCRIPTION LANGUAGE CODE (M_LCD) |
| 1 | AUDIO STREAM NUMBER (ASTN) FOR TT_DOM |
| 2 | SUB-PICTURE STREAM NUMBER (SPSTN) AND ON/OFF FLAG FOR TT_DOM |
| 3 | ANGLE NUMBER (AGLN) FOR TT_DOM |
| 4 | TITLE NUMBER (TTN) FOR TT_DOM |
| 5 | VTS TITLE NUMBER (VTS_TTN) FOR TT_DOM |
| 6 | TITLE PGC NUMBER (TT_PGCN) FOR TT_DOM |
| 7 | PART_OF_TITLE NUMBER (PTTN) FOR ONE_SEQUENTIAL_PGC_TITLE |
| 8 | HIGHLIGHTED BUTTON NUMBER (HL_BTNN) FOR SELECTION STATE |
| 9 | NAVIGATION TIMER (NV_TMR) |
| 10 | TT_PGCN FOR NV_TMR |
| 11 | PLAYER AUDIO MIXING MODE (P_AMXMD) FOR KARAOKE |
| 12 | COUNTRY CODE (CTY_CD) FOR PARENTAL MANAGEMENT |
| 13 | PARENTAL LEVEL (PTL_LVL) |
| 14 | PLAYER CONFIGURATION (P_CFG) FOR VIDEO |
| 15 | P_CFG FOR AUDIO |
| 16 | INITIAL LANGUAGE CODE (INI_LCD) FOR AST |
| 17 | INITIAL LANGUAGE CODE EXTENSION (INI_LCD_EXT) FOR AST |
| 18 | INI_LCD FOR SPST |
| 19 | INI_LCD_EXT FOR SPST |
| 20 | PLAYER REGION CODE |
| 21 | RESERVED |
| 22 | RESERVED |
| 23 | RESERVED FOR EXTENDED PLAYBACK MODE |

SPRM (SYSTEM PARAMETER)

POSITION OF DVD PACKET HEADER WHEN MEPG 2-PS IS TRANSMITTED

DVD PACKET HEADER (1/8 AND 2/8 SOURCE PACKET)

| TYPE OF DVD PACKET | PID EXAMPLE | TYPE OF DVD PACKET | PID EXAMPLE |
|---|---|---|---|
| VIDEO_PCK | 0x0020 | PCI_PKT | 0x0049 |
| AUDIO_PCK (STREAM 0) | 0x0021 | DSI_PKT | 0x004a |
| AUDIO_PCK (STREAM 7) | 0x0028 | SPRM_PKT | 0x004b |
| SP_PCK (STREAM 0) | 0x0029 | | |
| SP_PCK (STREAM 31) | 0x0048 | | |

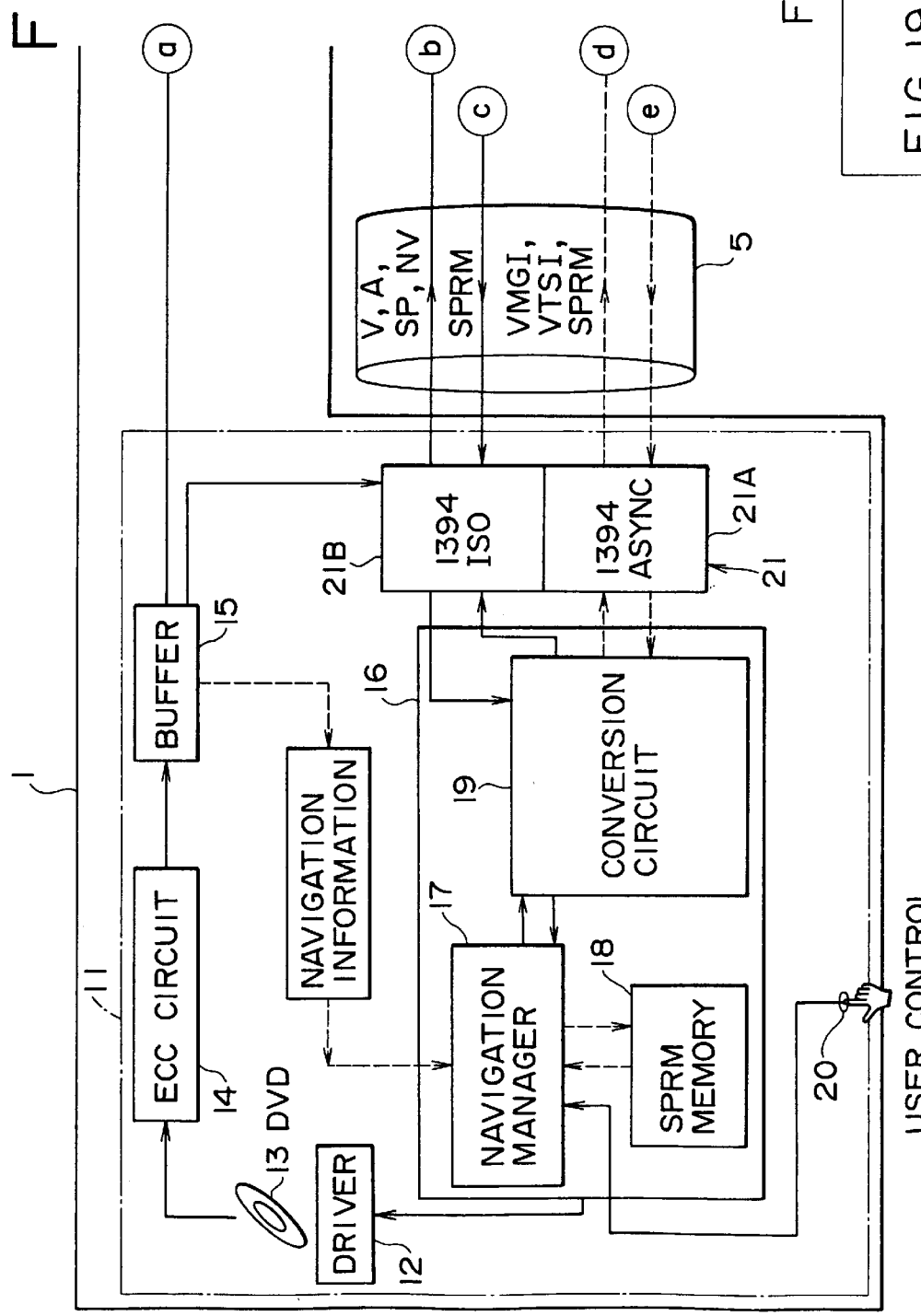

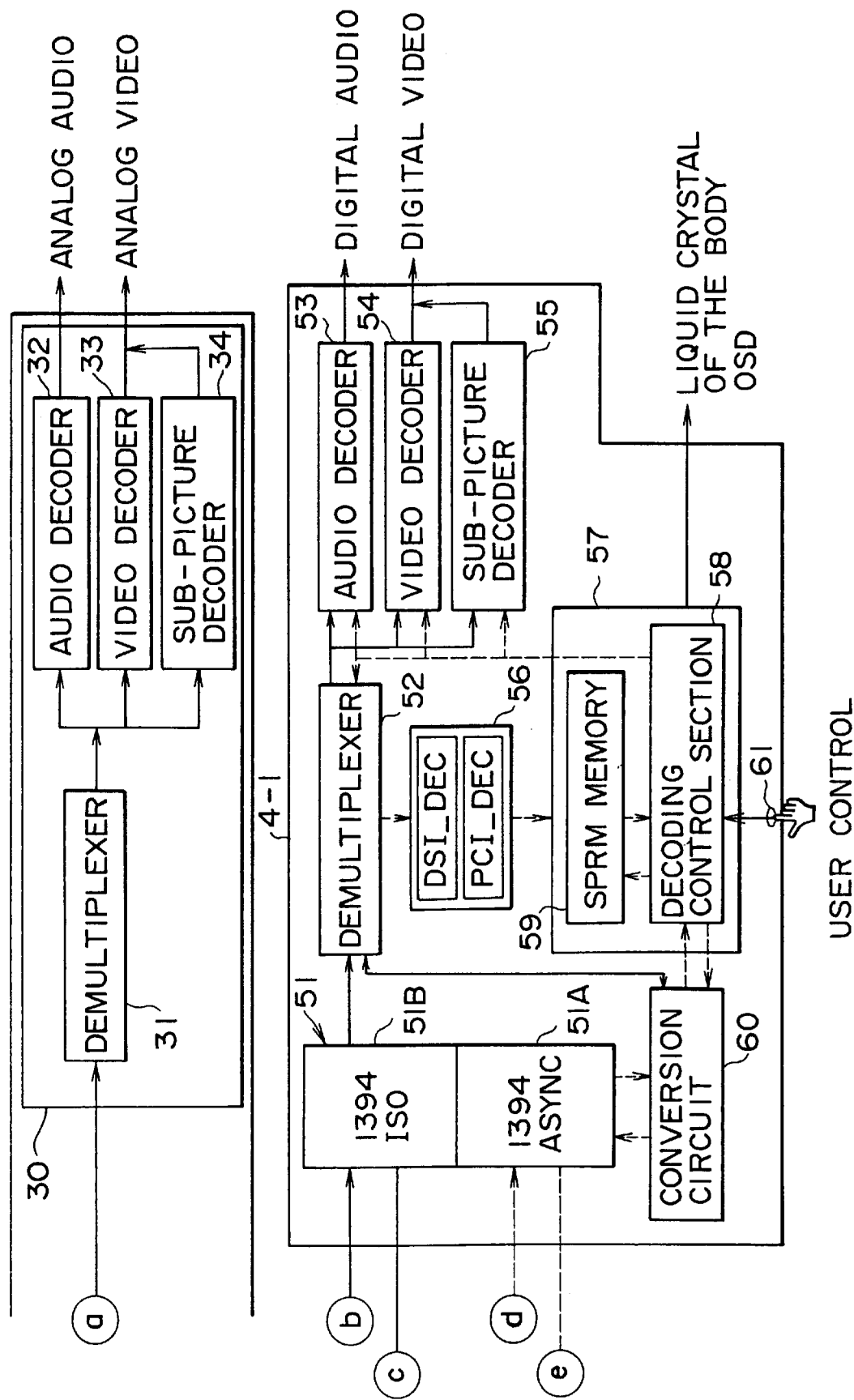

DATA DECODING SYSTEM, DATA DECODING METHOD, TRANSMISSION METHOD, TRANSMISSION DEVICE, RECEIVING DEVICE, AND RECEIVING METHOD

BACKGROUND OF THE INVENTION

1. Field of the Invention

This invention relates to a data decoding system, data decoding method, transmission device, transmission method, receiving device, and receiving method, and particularly relates to a data decoding system, data decoding method, transmission device, transmission method, receiving device, and receiving method in which the system parameter of devices for decoding the data transmitted through a digital interface is maintained always same in all the devices.

2. Description of the Related Art

Recently DVD (digital versatile disk)-Video (referred simply to as DVD hereinafter) has been standardized, popularization is anticipated in future. In the DVD, video data are compressed and recorded by way of MPEG (moving picture expert group) format. A DVD player reproduces a DVD in the driving section, and the decoding section decodes the reproduced data from the DVD and outputs it to a television receiver for displaying.

In the DVD player, system parameters such as a number of a menu to be selected (sub-picture stream number), an audio stream number to be selected, and a button number to be displayed highlighted are specified corresponding to the user operation, and when a system parameter is set and stored corresponding to the user operation, the system parameter is subjected to the corresponding processing.

Hereupon, for example, it is probable that television receivers having a function to decode data encoded by way of MPEG format will be developed. In such case, a DVD player and a television receiver having decoding function are connected each other through an AV bus, a bit stream as it is encoded is outputted from the DVD player, supplied to the television receiver having decoding function through the AV bus, and decoded in the television receiver.

However, because the system parameter is set on a DVD player, in the case that the DVD player is located far from the television receiver, for example, they are placed in different rooms separately, it is difficult to set the system parameter while seeing a reproduced image from the DVD.

The present invention was accomplished in view of such problem, and makes it possible to set a system parameter while seeing a reproduced image from a DVD.

SUMMARY OF THE INVENTION

In the data decoding system described in accordance with the invention, the first device indicates updating of a system parameter to the respective second devices when updating of the parameter is requested from one of the second devices.

In the data decoding method described in accordance with the invention, the first device indicates updating of a system parameter to the respective second devices when updating of the parameter is requested from one of the second devices.

In the transmission device described in accordance with the invention, when updating of a system parameter is requested from one of the decoders, updating of the system parameter is indicated to the respective decoders through the digital interface.

In the transmission method described in accordance with the invention, when updating of a system parameter is requested from one of the decoders, updating of the system parameter is indicated to the respective decoders through the digital interface.

The receiving device described in accordance with the invention is provided with a memory for storing system parameters, a request means for requesting updating of a system parameter to the transmission device side through the digital interface when updating of a system parameter is indicated, and an updating means for updating the stored system parameter when updating of the system parameter is indicated from the transmission device through the digital interface.

The receiving method described in accordance with the invention includes a storing step for storing system parameters, a requesting step for requesting updating of a system parameter to the transmission device side through the digital interface when updating of a system parameter is indicated, and an updating step for updating the stored system parameter when updating of the system parameter is indicated from the transmission device through the digital interface.

In the data decoding system described in accordance with the invention and data decoding method described in accordance with the invention, the first device indicates updating of a system parameter to the respective second devices when updating of the parameter is requested from one of the second devices.

In the transmission device described in accordance with the invention and transmission method described in accordance with the invention, when updating of a system parameter is requested from one of the decoders, updating of the system parameter is indicated to the respective decoders through the digital interface.

In the receiving device described in accordance with the invention and the receiving method described in accordance with the invention, when updating of the system parameter is indicated, updating of the system parameter is requested to the transmission device through the digital interface, and then updating of the system parameter is indicated through the digital interface, the stored system parameter is updated.

BRIEF DESCRIPTION OF THE DRAWINGS

FIG. 1 is a block diagram for illustrating an exemplary structure of an AV system to which the data decoding system of the present invention is applied.

FIG. 2 is a block diagram for illustrating an exemplary structure of the DVD player and decoder shown in FIG. 1.

FIG. 4 is a flow chart for describing the processing performed when the decoder shown in FIG. 2 is connected.

FIG. 5 is a flow chart for describing the processing performed when a system parameter is changed in the decoder shown in FIG. 2

FIG. 9 is a diagram for illustrating the format of a command and response in a data block shown in FIG. 8.

FIG. 10 is a diagram for describing an audio stream number parameter.

FIG. 11 is a diagram for describing a highlight button number parameter.

FIG. 12 is a diagram for describing a sub-picture stream number parameter.

FIG. 14 is a diagram for illustrating a list of the system parameter.

FIG. 19 is a block diagram for illustrating an another exemplary structure different from the DVD player and decoder shown in FIG. 1.

DETAILED DESCRIPTION OF THE PREFERRED EMBODIMENTS

Figure 3:
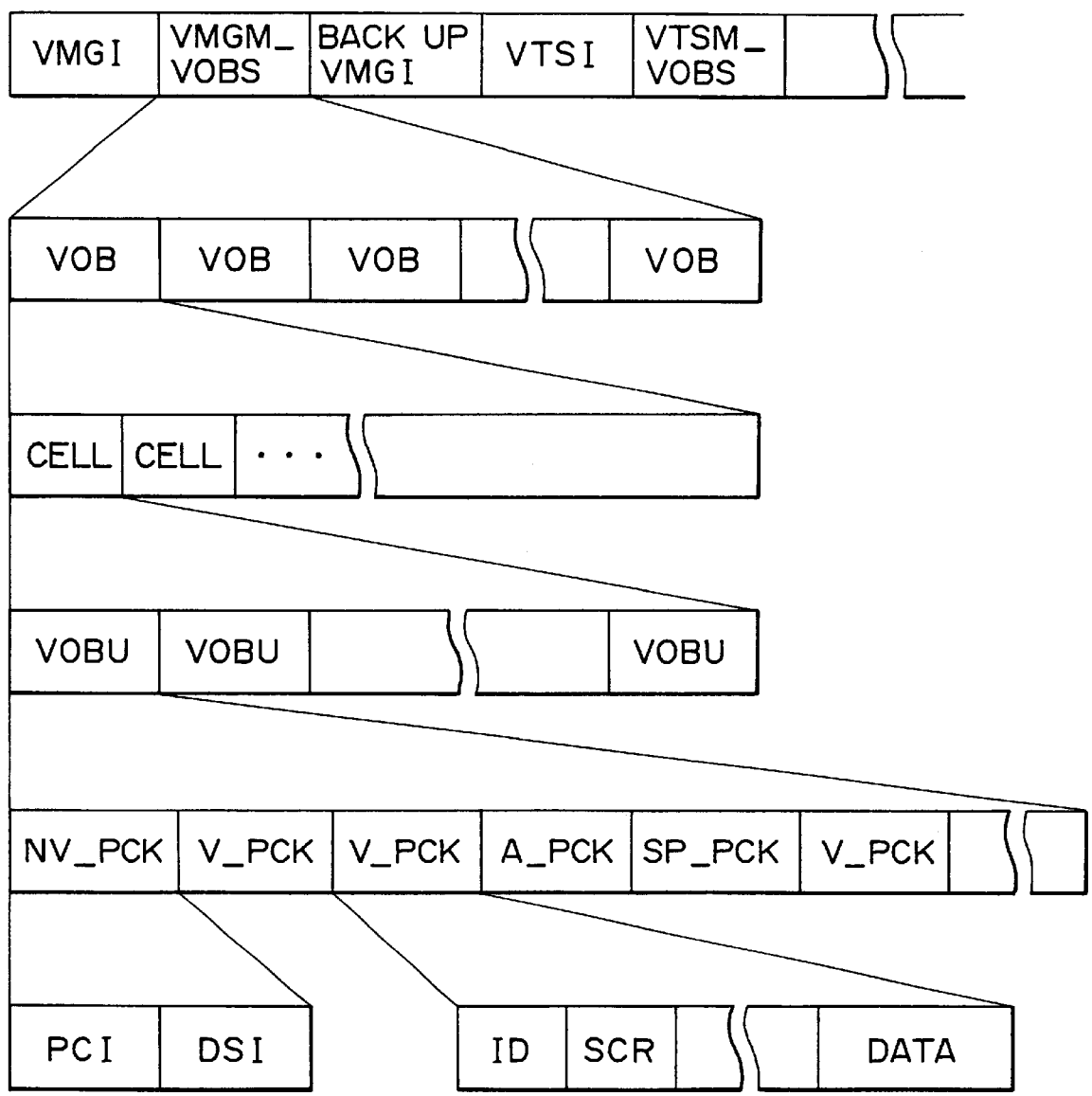
FIG. 3 is a diagram for describing the recorded content of the DVD shown in FIG. 1.

FIG. 1 is an exemplary structure of an AV system which utilizes a data decoding system of the present invention. In this embodiment, a DVD player 1 is structured so that an analog video signal which reproduces and outputs DVD is outputted to and displayed on an analog television receiver 2. To the DVD player 1, a plurality of digital television receivers (three in this case) 3-1 to 3-3 are connected through an AV bus 5. Each of the respective digital television receivers 3-1 to 3-3 is provided with decoders 4-1 to 4-3 respectively therein, and each decoder decodes an encoded video data supplied from the DVD player 1 through the AV bus 5. As the AV bus 5, for example, a bus specified by IEEE (Institute of Electrical and Electronics Engineers) 1394 High Performance Serial Bus Standard is used.

FIG. 2 is an exemplary internal structure of the DVD player 1 and decoder 4-1. The decoders 4-2 and 4-3 not shown in the drawing have the same structure as the decoder 4-1.

The DVD player 1 is provided with a DVD driving section 11 and decoder 30 therein. The DVD driving section 11 drives a DVD 13 with a driver 12, and supplies the reproduction output to an ECC circuit 14. The ECC circuit 14 performs error correction processing of the reproduction output data from the DVD 13, thereafter outputs it to a buffer 15. A system controller 16 extracts a navigation information (the detail will be described hereinafter) from the data stored in the buffer 15, and the navigation information is fetched by a navigation manager 17.

As shown in FIG. 3 in detail, a video manager information (VMGI) is recorded as a navigation data in the DVD 13, and next a VMGM_VOBS (video object set for VMG menu) is recorded as a presentation data followed by a backup data of the VMGI.

Further next, a video title set information (VTSI) is recorded as a navigation data, and a VTSM_VOBS (video object set for VTS menu) is recorded subsequently.

The VMGM_VOBS is composed of a plurality of VOBs (video object), each VOB is composed of a plurality of cells, and each cell is composed of a plurality of VOBUs (video object unit).

Further, each VOBU is composed of NV_PCK (navigation pack), V_PCK (video pack), A_PCK (audio pack), and SP_PCK (sub-picture pack). Each pack is composed of 2048 bytes.

Each NV_PCK is composed of a PCI (presentation control information) and DSI (data search information).

Each V_PCK is composed of ID.SCR (system clock reference) of the pack and additionally a video data.

The navigation information fetched by the navigation manager 17 means the above-mentioned VMGI.VTSI and NV_PCK.

An output section 20 comprises a button, and switch or remote commander (not shown in the drawing), and outputs signals corresponding to user operation to the navigation manager 17. The navigation manager 17 sets a prescribed system parameter corresponding to an output, and stores the system parameter (SPRM) in a memory 18.

A conversion circuit 19 converts the data supplied from the navigation manager 17 to the data of IEEE 1394 format, outputs it to an interface 21, converts the IEEE 1394 format data supplied from the interface 21 to a data having a format which is possible to be interpreted by the navigation manager 17, and outputs it to the navigation manager 17.

The interface 21 comprises a 1394 asynchronous section 21A for performing interface processing between the conversion circuit 19 and AV bus 5 and a 1394 isochronous section 21B for performing interface processing when the video data supplied from the buffer 15 is outputted to the AV bus 5.

A decoder 30 has a demultiplexer 31 for separating the data supplied from the buffer 15 into audio data, video data, and sub-picture data, and the demultiplexer 31 outputs these data to a corresponding audio decoder 32, video decoder 33, and sub-picture decoder 34. The audio decoder 32 decodes the output audio data and outputs it to an analog television receiver 2 as an analog audio signal. The video decoder 33 decodes the input video data, superimposes the decoded video data on the sub-picture video data decoded by the sub-picture decoder 34, and outputs to the analog television receiver 2 as an analog video signal.

The decoder 4-1 has an interface 51, a 1394 isochronous section 51B of the interface 51 fetches the video data, audio data, sub-picture data, and navigation information data supplied through the AV bus 5, and outputs them to a demultiplexer 52. The demultiplexer 52 separates the input data into an audio data, video data, sub-picture data, and NV_PCK, and outputs them respectively to an audio decoder 53, video decoder 54, and sub-picture decoder 55 or decoder 56. The decoder 56 is provided with a PCI decoder and DSI decoder therein, decodes the input PCI of NV_PCK and DSI respectively, and outputs them to a system controller 57.

The 1394 asynchronous section 51A of the interface 51 supplies the control data (command) supplied from through the AV bus 5 to a conversion circuit 60, and performs interface processing to output the control data (command) supplied from the conversion circuit 60 to the AV bus 5. The conversion circuit 60 performs processing to convert the signal, which is outputted from a decoding control section 58 when an input section 61 having a switch, button, and remote commander (not shown in the drawing) is operated by a user, to a data having 1394 format, outputs it to the 1394 asynchronous section 51A, converts the data format supplied from the 1394 asynchronous section 51A to the data format of the system controller 57, and outputs it to a decoding control section 58 of the system controller 57. The decoding control section 58 controls decoding processing correspondingly to the navigation data supplied from the decoder 56 or the control data supplied from the conversion circuit 60. A memory 59 stores parameters corresponding to user operation therein.

Next, the operation is described. FIG. 4 is a flow chart for describing the processing performed by the decoder 4-1, for example, when the digital television receiver 3-1 is connected to the AV bus 5. First in the step S1, the digital television receiver 5-1 generates a request for transmission of a system parameter to the DVD player 1. The command is converted to a 1394 format command, thereafter subjected to interface processing performed by the 1394 asynchronous section 51A, and then transmitted to the DVD player 1 through the AV bus 5.

In the DVD player 1, the command is fetched by the 1394 asynchronous section 21A of the interface 21, and supplied to the conversion circuit 19. The conversion circuit 19 converts the input command to a command which is possible to be interpreted by the navigation manager 17, and then outputs it to the navigation manager 17.

The navigation manager 17 reads a system parameter stored in the memory 18 at that time point when receiving the command as described hereinafter with reference to FIG. 5, and outputs it to the conversion circuit 19. The conversion circuit 19 converts the input system parameter to a 1394 format parameter, and then outputs it to the AV bus 5 through the 1394 asynchronous section 21A of the interface 21.

In the decoder 4-1, when the system parameter is fetched by the 1394 asynchronous section 51A, the conversion circuit 60 converts the system parameter to a data which is possible to be interpreted by the system controller 57, and then output it to decoding control section 58. The decoding control section 58 waits until the system parameter is received in the step S2, and the sequence proceeds to the step S3 when receiving, the decoding control section 58 supplies the received system parameter to the memory 59 for storing. Thereafter, the decoding control section 58 controls decoding processing according to the system parameter stored in the memory 59.

Therefore, the audio stream and sub-picture stream of the number specified by the parameter are selected and displayed. The button of the specified number is displayed highlighted. Herein, the highlighted display means differently displaying of a specified key in order to differentiate the key from other keys by displaying reversely the operation key (icon) displayed on the screen of a digital television receiver.

In the condition that the digital television receiver 3-1 is connected to the AV bus 5 already, the same processing is performed when a user operates the input section 61 to input a command for converting the system parameter. In detail in this case, as shown in FIG. 5, the input section 61 is operated, and setting of the system parameter is inputted, then the decoding control section 58 generates a command which requests for generation of the system parameter corresponding to this operation in the step S11, and outputs the command to the conversion circuit 60. This command is transmitted to the navigation manager 17 of the DVD player 1 in the same way as described herein above. As described hereinafter, the navigation manager 17 generates a system parameter corresponding to the command (step S23 in FIG. 6), and transmits it to the decoder 4-1 (step S25 in FIG. 6).

The decoding control section 58 of the decoder 4-1 receives the system parameter in the step S12, and then stores it in the memory 59.

Figure 6:
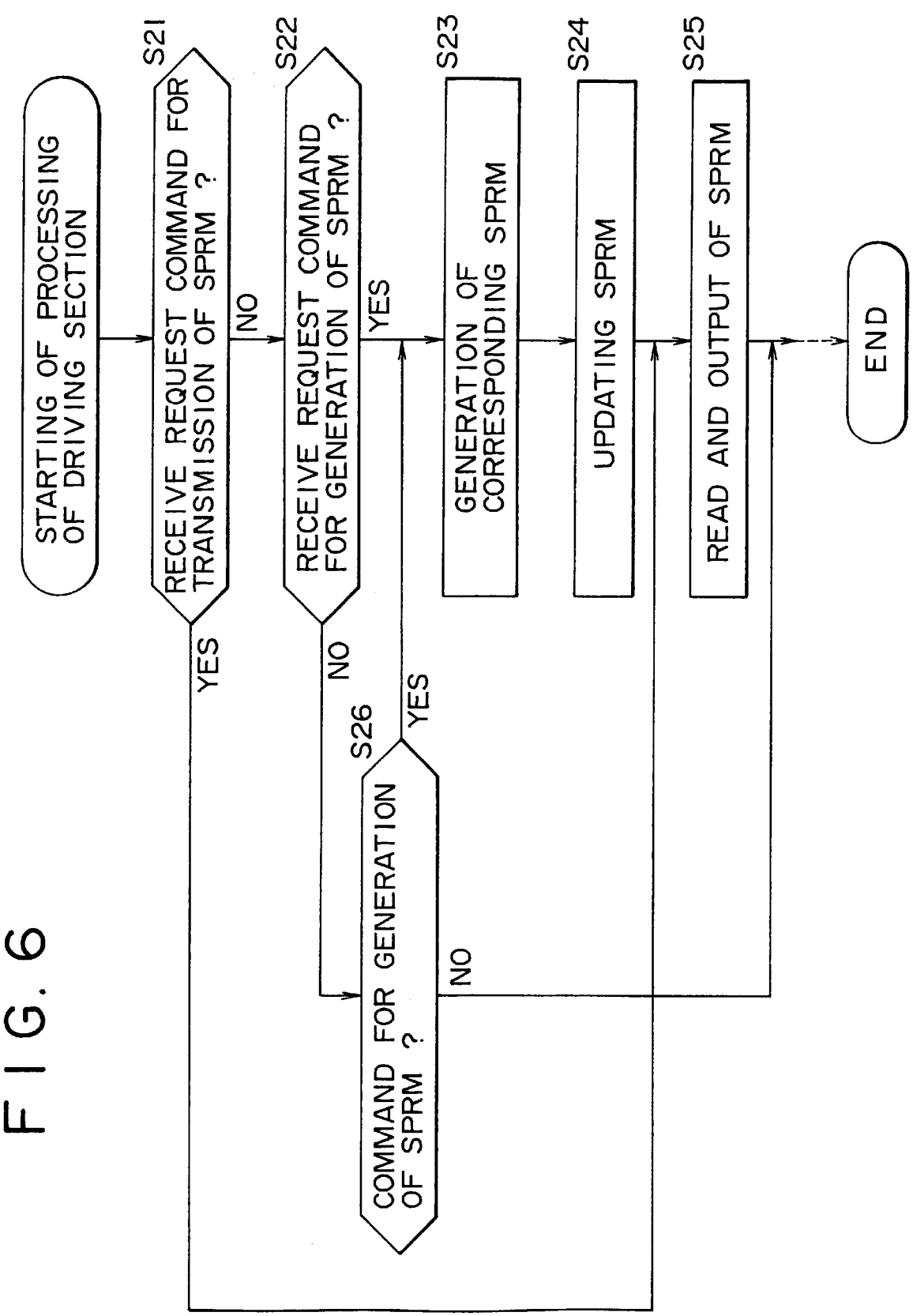
FIG. 6 is a flow chart for describing the processing performed in the DVD player shown in FIG. 2.

Next, the operation of the navigation manager 17 of the DVD driving section 11 is described with reference to the flow chart in FIG. 6. First in the step S21, the navigation manager 17 judges whether the navigation manager 17 receives a command of transmission request for a system parameter from the decoder 4-i (i=1, 2, or 3). If the navigation manager 17 judges the command to be received, the sequence proceeds to the step S25, the navigation manager 17 reads a system parameter stored in the memory 18, supplies it to the conversion circuit 19 to convert it to a 1394 format data, and then transmits it to the decoder 4-1 through the 1394 asynchronous section 21A. As described with reference to FIG. 4, the decoding control section 58 of the decoder 4-i stores the system parameter in the memory 59 when receiving it (step S3 in FIG. 4).

On the other hand, in the step S21, if the command of transmission request for a system parameter is judged to be not received, then the sequence proceeds to the step 23, and the navigation manager 17 generates a system parameter corresponding to the input. The generated system parameter is stored in the memory 18 in the step S24. The navigation manager 17 further reads the system parameter stored in the memory 18 in the step S25, and transmits it to the decoder 4-i in the same way as described herein above. As described with reference to FIG. 5, the decoder 4-i receives the system parameter and then stores it in the memory 59 (step S13 in FIG. 5).

In the step S22, if the command of generation request for a parameter is judged to be not received, then the sequence proceeds to the step S26, whether the input section 20 inputs a generation command for a system parameter is judged. If the generation command request for a system parameter is judged to be inputted, then the sequence proceeds to the step S23, the navigation manager 17 generates a system parameter corresponding to the input, and stores it in the memory 18 in the step S24. Further in the step S25, the system parameter is read from the memory 18, and outputted to the decoders 4-1 to 4-3.

Figure 7:
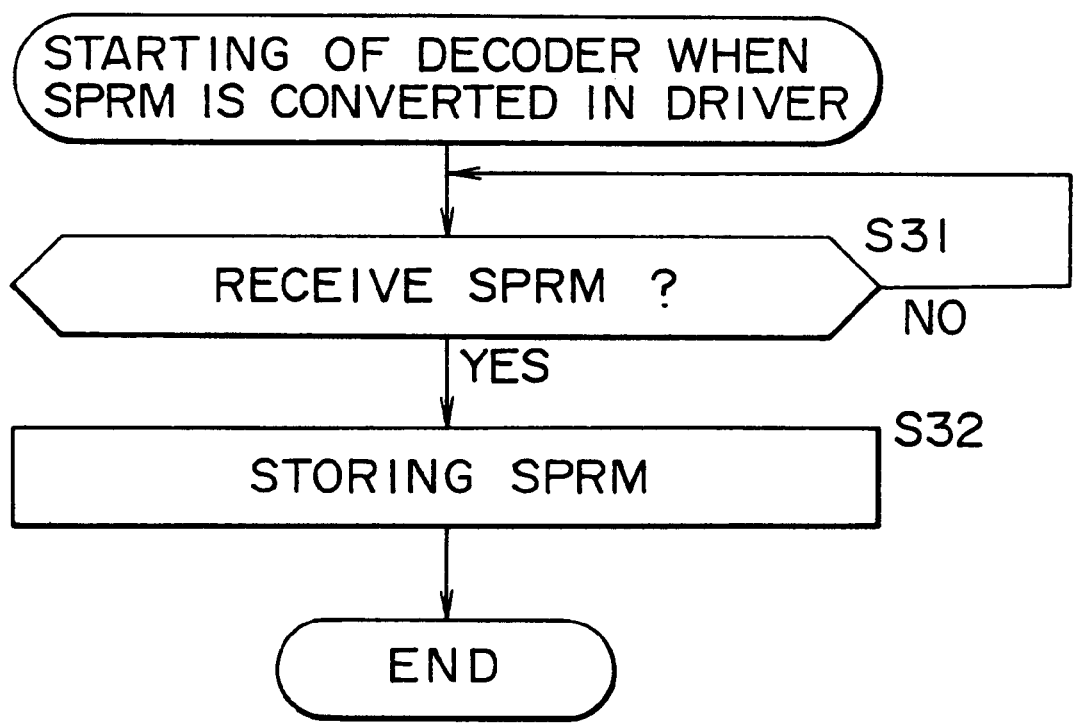
FIG. 7 is a flow chart for describing the processing performed when a system parameter is changed in the DVD player shown in FIG. 2.

FIG. 7 shows processing of the decoder 4-i in this case. In detail first in the step S31, the decoder 4-i remains in waiting until the decoder 4-i receives the system parameter, and when receiving the system parameter, the decoder 4-i stores it in the memory 59 in the step S32.

As described herein above, when the digital television receiver 3-i is connected to the AV bus 5, the corresponding decoder 4-i requests automatically transmission of the system parameter from the DVD player 1, and stores the system parameter in the memory 59. Further, in a prescribed digital television receiver 3-i, change of a system parameter is indicated, the DVD player 1 generates a system parameter corresponding to the indication, the system parameter is not only stored in the memory 18 but also transmitted to the decoders 4-i of all the digital television receivers 3-i connected to the AV bus 5 and stored therein. In the case that change of a system parameter was indicated in the DVD player 1 and the system parameter was changed in response to the indication, the changed system parameter is transmitted to the decoders 4-i of all the digital television receivers 3-i connected to the AV bus 5. As described herein above, the DVD player 1 and the decoders 4-i of the respective digital television receivers 3-i hold always the same system parameter.

A system parameter is stored in the decoders 4-1 to 4-3 of the digital television receivers 3-1 to 3-3 as described herein above, and in the DVD driving section 11, the format of a video data, audio data, sub-picture data, and navigation data outputted from the buffer 15 is converted by the 1394 isochronous section 21B, then these data are supplied to the decoders 4-1 to 4-3 of the digital television receivers 3-1 to 3-3.

The 1394 isochronous sections 51B of the respective decoders 4-1 to 4-3 converts the format of the input data, and outputs them to the demultiplexer 52. The demultiplexer 52 separates the input data into the audio data, video data, and sub-picture data respectively, and outputs them to the audio decoder 53, video decoder 54, or sub-picture decoder 55 respectively. The audio decoder 53 decodes the input audio data, and outputs it to a built-in speaker (not shown in the drawing). The video decoder 54 decodes the input video data. The sub-picture decoder 55 decodes the input sub-picture data. Outputs from the video decoder 54 and sub-picture decoder 55 are superimposed, subjected to D/A conversion by a D/A conversion circuit not shown in the drawing, and outputted to and displayed on the corresponding display section such as a CRT.

The decoding control section 58 controls decoding processing of the audio decoder 53, video decoder 54, and sub-picture decoder 55 correspondingly to the system parameter stored in the memory 59.

The decoding control section 58, in the case that, for example, a program title is required to be displayed, generates the corresponding OSD data, outputs it to liquid crystal display section not shown in the drawing for displaying.

As described herein above, the same reproduced image is seen always on the digital television receivers 3-1 to 3-3.

The data outputted from the buffer 15 is separated into audio data, video data, and sub-picture data by the demultiplexer 31 in the decoder 30 of the DVD player 1, and the audio decoder 32, video decoder 33, and sub-picture decoder 34 decode these corresponding data. The audio data decoded by the audio decoder 32 is subjected to D/A conversion by a D/A converter not shown in the drawing, and outputted to a speaker (not shown in the drawing) of the analog television receiver 2. Further the video data decoded by the video decoder 33 and sub-picture video data decoded by the sub-picture decoder 34 are superimposed, the superimposed data is subjected to D/A conversion, and outputted to the analog television receiver 2 for displaying.

The system controller 16 controls decoding processing performed by the decoder 30 correspondingly to the system parameter stored in the memory 18.

Figure 8:
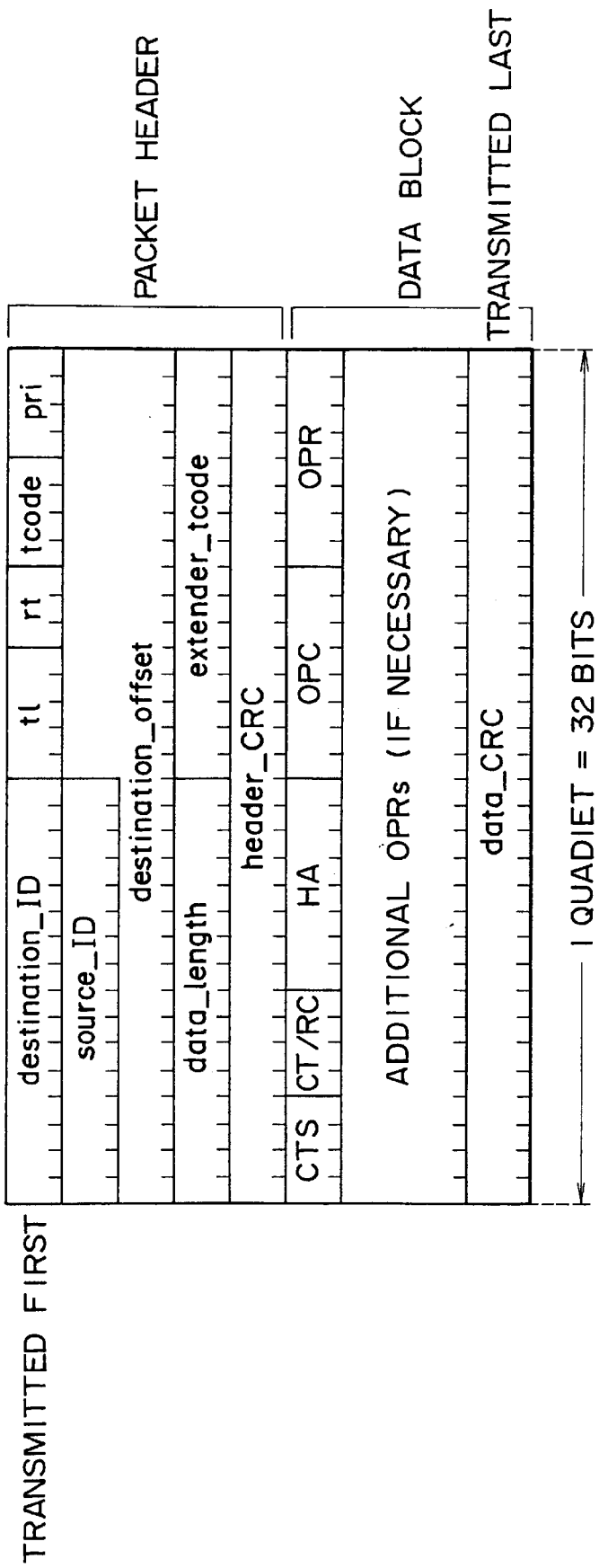
FIG. 8 is a diagram for describing the structure of a packet in the interface shown in FIG. 2.

FIG. 8 shows the structure of the command generated in the 1394 asynchronous sections 21A and 51A and response packet. As shown in the drawing, the packet is composed of a packet header and data block. In a packet header, a destination_ID for identifying an addressee, tl (transaction label) for representing processing label, rt (retry code) for representing retry reproduction, tcode (transaction code) for representing processing code, and pri (priority) are disposed in the order. Further, in the next place, source_ID for representing an addressee is recorded, and then destination_ offset for representing lower order 48 bits of the address of the addressee is recorded.

Further subsequently a data_length for representing data length is disposed, followed by an extended_tcode for representing other processing codes, and finally a header_CRC which is an error detection code in the header is disposed.

A data block is composed of CTS, CT/RC, HA, OPC, OPR, and data_CRC which is an error detection code in the data. CTS to OPR are specified as shown in FIG. 9. In detail, in the case of transmission of a command as shown in FIG. 9(A), 0 is loaded in the CTS, and a code for representing type of request is loaded in the CT/RC. Further in the HA, an addresser in the apparatus, for example, an ID of the navigation manager 17 in the DVD driving section 11 or the decoding control section 58 in the decoder 4-1 is loaded. A command to be transmitted is loaded in the OPC and parameters are loaded in OPRs. In the case of the present invention, an updating request command (a command for indicating updating) is loaded in OPC, and system parameter information is loaded in OPRs.

For transmission of a response, as shown in FIG. 9(B), 0 is loaded in the CTS, and a code for representing type of the response is loaded in the CT/RC. In the HA an ID of addresser in the apparatus is loaded, and in the OPC a code of the processed command is loaded. Parameters are loaded in OPRs.

FIG. 10 to FIG. 12 shows formats of the system parameters. FIG. 10 is an exemplary arrangement of the parameter for specifying an audio stream number. As shown in the drawing, an audio stream number is loaded in the low order 4 bits out of 1 byte data from the bit b15 to b0.

As shown in FIG. 11, for specifying a highlight button number, the highlight button number is loaded in the high order 6 bits from the bit b15 to bit b10 out of 1 byte data.

For specifying a sub-picture stream number, as shown in FIG. 12, a flag for representing whether the sub-picture is displayed is loaded in the bit b6, and the sub-picture stream number is loaded in the bits b5 to b0. The bit group from b15 to b8 and the bit group from b7 to b0 of the system parameter shown in FIGS. 10, 11, and 12 are respectively stored in the parameter-2 area and in the parameter-1 area of the OPR shown in FIG. 9.

Figure 13:
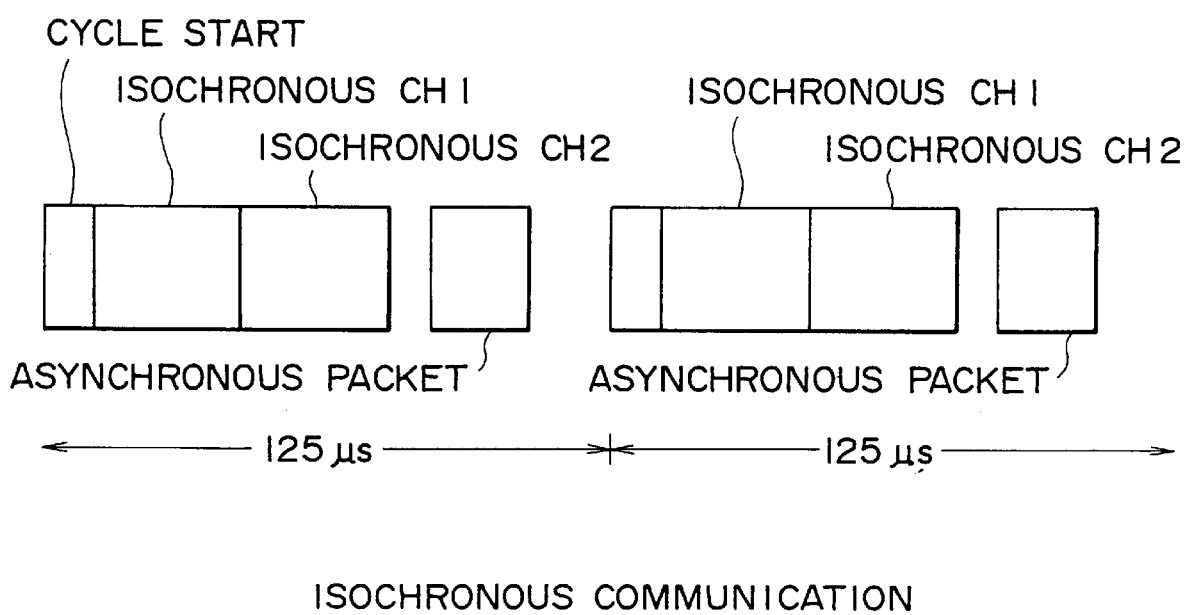
FIG. 13 is a diagram for describing the isochronous communication.

The 1394 involves isochronous communication and asynchronous communication, and the former involves communication of data and the latter involves communication of commands and responses. FIG. 13 shows schematically isochronous communication in the 1394. As shown in the drawing, in the isochronous communication, one AV apparatus out of the AV apparatus connected to the bus is used as a route, and the route transmits a cycle start packet at the first timing having a cycle of 125 μs. The respective AV apparatus which are involved in isochronous communication are assigned to specific time zones in each cycle, and transmit data such as isochronous Ch1 or isochronous Ch2 in the time zone (at timing) assigned to the respective AV apparatus. As described herein above, communication is carried out with a certain time interval.

On the other hand, asynchronous communication is carried out in the time zone while isochronous communication is not on the way, and the period of asynchronous communication is not always constant.

To avoid such inconvenience, the above-mentioned system parameter may be transmitted by way of isochronous communication because data are transmitted consistently every 125 μs in isochronous communication. In the case of isochronous communication, though transmission of a system parameter can not be assured because an acknowledge is not returned, the certainty of transmission increases due to the periodical transmission with a certain time interval.

FIG. 14 shows a list of system parameters to be transmitted. These parameters are stored in the SPRM memory 18 shown in FIG. 2, and each system parameter is represented by 16 bit integer (binary) without code. M_LCD (menu description language code) is set in SPRM (0). ASTN (audio stream number ) is set in SPRM (1). SPSTN (sub-picture stream number) is set in SPRM (2). AGLN (angle number) is set in SPRM (3). TTN (title number) is set in SPRM (4). VTS_TTN (VTS title number) is set in SPRM (5). TT_PGCN (title PGC number) is set in SPRM (6).

PTTN (part_of_title number) is set in SPRM (7). HL_BTNN (highlighted button number) is set in SPRM (8).

NR_TMR (navigation timer) is set in SPRM (9). TT_PGCN for NV_TMR is set in SPRM (10). P_AMXMD (player audio mixing mode) is set in SPRM (11). CTY_CD (country code) is set in SPRM (12). PTL_LVL (parental level) is set in SPRM (13). P_CFG (player configuration for video) is set in SPRM (14).

P_CFG for audio is set in SPRM (15). INI_LCD (initial language code) is set in SPRM (16). INI_LCD_EXT (initial language code extension) is set in SPRM (17). INI_LCD for SPST is set in SPRM (18). INI_LCD_EXT for SPST is set in SPRM (19). SPRM (21) and SPRM (22) are spare areas. SPRM (23) is a spare area for extended playback mode. The list of these system parameters is described in DVD Specifications for Read-only Disc (August 1996), it should be referred for details.

Figure 15:
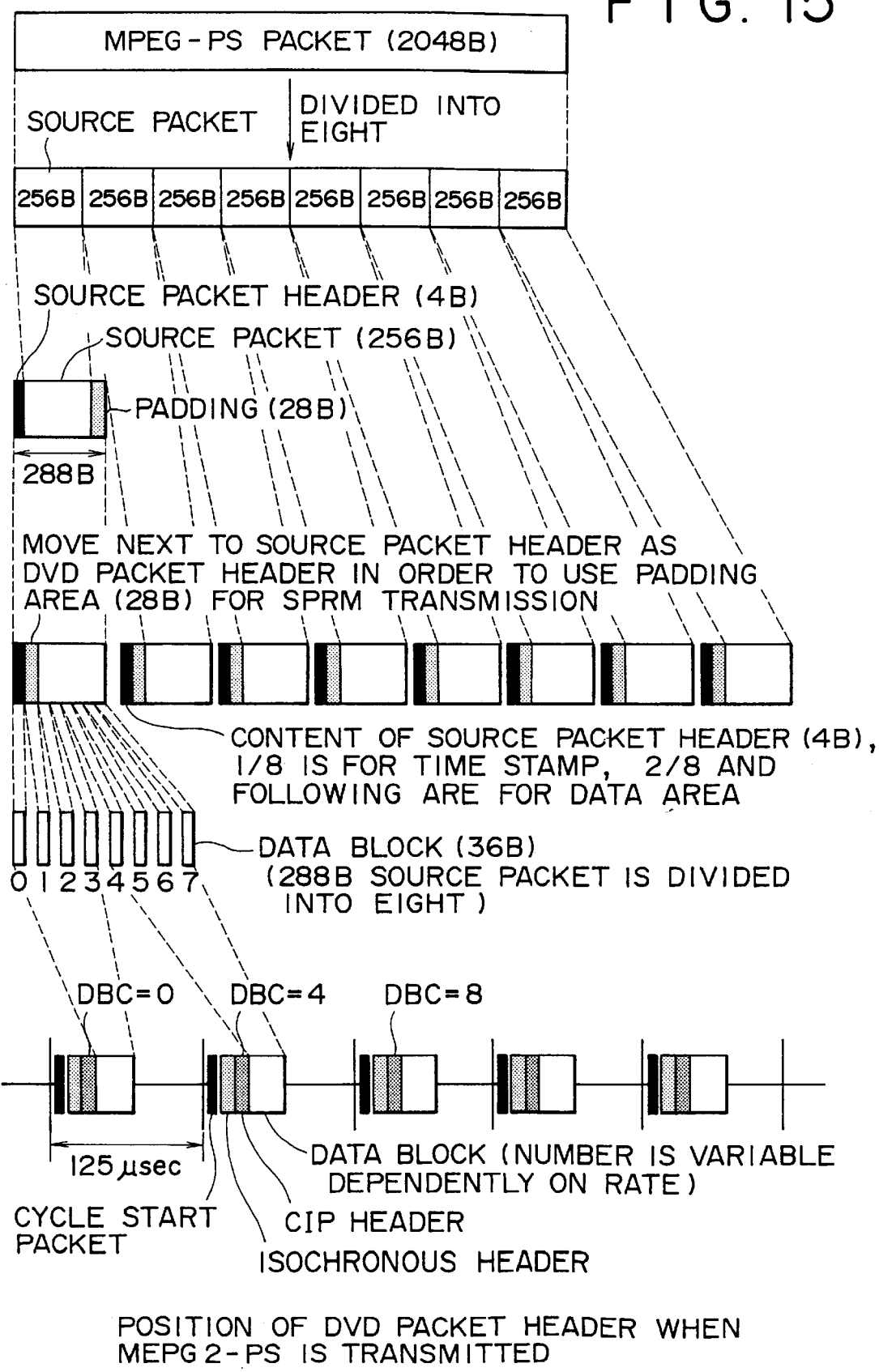
FIG. 15 is a diagram for illustrating the position of the DVD packet header when MPEG2-PS is transmitted.

FIG. 15 shows the position of the DVD packet header when MPEG-PS (program stream) is transmitted. In the case of MPEG-PS transmission, the size of a pack data is as relatively large as 2048 bytes (kB), and a pack data is divided into 8 and each divided pack data is referred to as a source packet. The size of each source packet is 256 bytes. Each source packet is given a source packet header of 4 bytes. A time stamp is stored in the ⅛ source packet, and ⅔ and following source packets are used as a data area.

A padding data of 28 bytes is given to each source packet and the size of each source packet is increased to 288 bytes so that the transmission size is exactly divisible by 4 byte unit, because IEEE 1394 involves data in 4 byte unit. In this case, the padding area is used for data transmission of DVD so that the padding area where padding data are recorded is used effectively. In detail, the above-mentioned padding area is transferred to the place next to the source packet header (4 bytes) which stores the time stamp, and used as a DVD packet header.

Next, a source packet of 288 bytes is divided into 8 data blocks of 36 bytes each. CIP header and isochronous header are given to a prescribed number of data blocks. As described herein above with reference to FIG. 13, in the first timing with a cycle of 125 μs, a cycle start packet is transmitted, and subsequently the above-mentioned data block is transmitted. Each AV apparatus for isochronous communication is allocated with a specified time zone in each cycle, and transmits the system parameter such as isochronous Ch1 or isochronous Ch2 within the allocated time zone (timing). As described herein above, communication is carried out with a certain time interval in isochronous communication, and the system parameter is transmitted periodically to each AV apparatus.

As shown in FIG. 15, because a MPEG-PS packet of 2048 bytes is divided into 8 source packets and each source packet is given a DVD packet header, one pack contains 8 DVD packet header. Each source packet can be specified with DBC (data block counter) of CIP (common isochronous packet) header, therefore 8 types of DVD packet headers can be identified. Thus the data quantity in the DVD packet header area per one pack is 224 bytes (=28 bytes×8).

Figure 16:
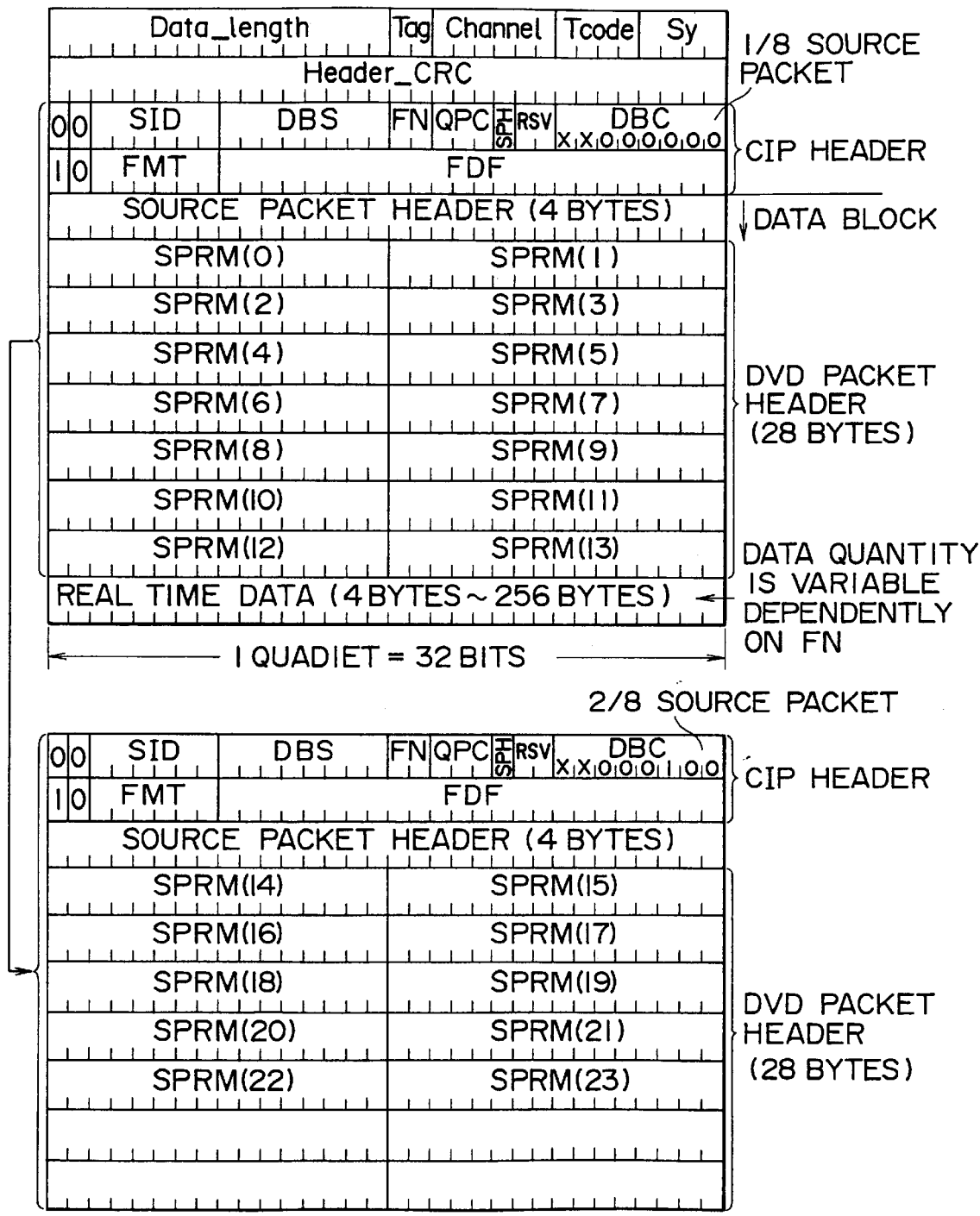
FIG. 16 is a diagram for illustrating an exemplary structure of a DVD packet header.

FIG. 16 is an exemplary fixed allocation of the above-mentioned DVD packet header for the system parameter. The first 16 bytes are a packet header of the data packet transmitted in isochronous communication, and the packet header is composed of a data_length for represents data length, a Tag for representing format type of the data transmitted in the packet, a Channel for representing the channel number (any one of the numbers from 0 to 63) of the packet, a tcode for representing processing code, and a synchronizing code Sy specified by each application. The header CRC (Header_CRC) is an error detection code of the packet header.

Next to the packet header, a CIP header is disposed. The CIP header is composed of a transmission node number SID, a data block size in quadlets DBS, a fraction number of the data in quadlets FN, a number of quadlets added so that the length of a source packet obtained by dividing the data is adjusted to a prescribed fixed length (1 quadlet is 4 bytes) QPC (quadlet padding count), a flag of the header of the source packet SPH (source packet header), a counter for detecting the defect of the packet DBC, a signal format FMT, and a format dependent field FDF. The RSV is a spare area.

The head data block number (0 to 63) out of data blocks included in the isochronous packet is set in the counter DBC. In the example of this case, 0 is set in the DBC of the CIP header of the first isochronous packet, and 4 is set in the DBC of the CIP header of the next isochronous packet. In the DBC of the CPI header of the following isochronous packet, 8 is set. Information for identifying between MPEG-PS (program stream) and MPEG-TS (transport stream) is set in the FDF.

The data block next to the CIP header is composed of a source packet header of 4 bytes, a DVD packet header of 28 bytes, and a real time data. The real time data is a data to be transmitted by nature, the data quantity varies dependently on FN value which represents the number of division of the data, and ranges from 4 bytes to 256 bytes.

There are 24 types of system parameters as shown in FIG. 14. Herein n-th system parameter is referred to as SPRM (n) (n is selected from 0 to 23). For example, SPRM (0) to SPRM (13) are allocated to the ⅛ DVD packet header, and SPRM (14) to SPRM (23) are allocated to the ⅔ DVD packet header out of the 8 DVD packet headers in one pack. As described in the case of the above-mentioned source packet header, the ⅜ and following DVD packet header may be used as the data area.

Figures 17, 18:
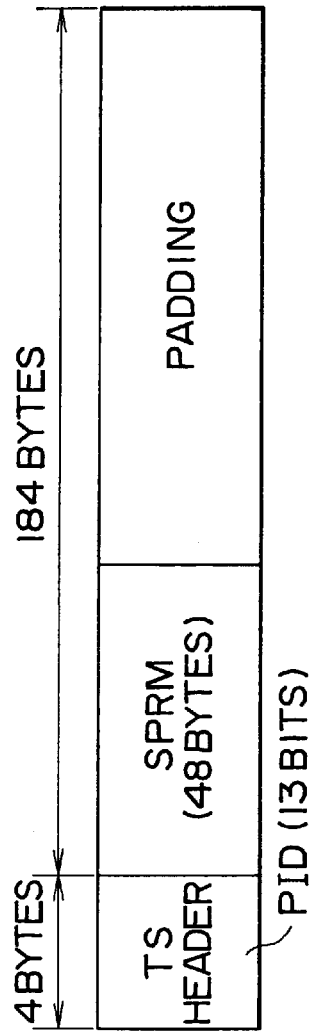
FIG. 17 is a diagram for illustrating an exemplary packet identifier for MPEG2-TS transmission.
FIG. 18 is a diagram for illustrating an exemplary program packet for MPEG2-TS transmission.

FIG. 17 shows an exemplary extension of a packet identifier for MPEG-TS transmission. In detail, SPRM packet (SPRM_PKT) is provided additionally as a type of DVD packet, and this packet corresponds to 004b (hexadecimal digit).

FIG. 18 shows an exemplary structure of a program packet for SPRM transmission when MPEG-TS is transmitted. In detail, subsequently to a TS packet header area of 4 bytes, a data area of 184 bytes are formed. The first 48 bytes in the data area is a system parameter area, and the residual 132 bytes is used as padding byte (dummy data) so that the packet length is adjusted to 188 bytes.

These packets are transmitted periodically between the DVD player 1 and the digital television receivers 3-1 to 3-3 by way of the same processing basically as described herein above with reference to flow charts in FIG. 4 to FIG. 7. However in this case, because communication is performed by way of isochronous communication, as shown in FIG. 19, the conversion circuit 19 converts a system parameter supplied from the navigation manager 17 to the data of isochronous communication format of the IEEE 1394, outputs it to the 1394 isochronous section 21B of the interface 21, and also converts IEEE 1394 format data supplied from the interface 21 to the data of the format which is possible to be interpreted by the navigation manager 17, and outputs it to the navigation manager 17. The 1394 isochronous section 21B of the interface 21 performs interface processing required for the case that the system parameter is communicated between the conversion circuit 19 and the AV bus.

For transmitting MPEG2-PS, the demultiplexer 52 fetches the DVD packet header of the packet (FIG. 15) supplied from the 1394 isochronous section 51B, and supplies it to the conversion circuit 60. Further for transmitting MPEG2-TS, the demultiplexer 52 fetches the 48 byte data (system parameter) subsequent to the TS header of the program packet (FIG. 18) supplied from the 1394 isochronous section 51B, and supplies it to the conversion circuit 60.

The conversion circuit 60 converts the data format supplied from the 1394 isochronous section 51B to the data format of the system controller 57, and outputs it to the decoding control section 58 of the system controller 57. The following processing is the same as that performed in the case described herein above with reference to FIG. 2, and detailed descriptions are omitted.

When the input section 61 is operated, the conversion circuit 60 converts the signal (system parameter) outputted from the decoding control section 58 to the data compliant to the IEEE 1394 format, and then outputs it to the 1394 isochronous section 51B. The 1394 isochronous section 51B transmits the system parameter supplied from the conversion circuit 60 to the DVD player 1 through the AV bus 5 by way of MPEG2-PS or MPEG2-TS.

As described hereinbefore, the system parameter can be transmitted periodically between apparatus by way of isochronous communication. When, the system parameter can be transmitted to a plurality of apparatus simultaneously. Thereby the system parameter can be transmitted consistently to each apparatus even when the AV bus is busy. Further the system parameter can be transmitted automatically to apparatus connected additionally by way of broadcast. When transmission error happens to occur, the error is corrected automatically because the same data is transmitted repeatedly afterward.

In the above-mentioned embodiment, the IEEE 1394 is used, however other digital interface may be used. The AV apparatus having a built-in decoder may be an apparatus other than the digital television receiver.

As described hereinbefore, according to the data decoding system described in claim 1 and the data decoding method described in claim 3, when updating of a system parameter is indicated by the second device, the first device indicates updating of the system parameter to the respective second devices through the digital interface, thereby the system parameter can be properly changed in the second devices even if the first device and second devices are located apart.

According to the transmission device described in claim 4 and the transmission method described in claim 11, when one decoder indicates updating of a system parameter, updating of the system parameter is indicated to the respective decoders through the digital interface, thereby the system parameter can be changed properly from an arbitrary decoder out of a plurality of decoders.

According to the receiving device described claim 18 and the receiving method described in claim 24, when updating of a system parameter is indicated, updating of the system parameter is requested to the transmission device through the digital interface, and updating of a system parameter is indicated from the transmission device through the digital interface, then the stored system parameter is updated, thereby the system parameter can be changed properly in that or another receiving device.

What is claimed is:

1. A data decoding system comprising:
    a device for reproducing and transmitting from a single source at least encoded video data through a digital interface, and
    a plurality of receiving devices for receiving and decoding the data transmitted through said digital interface and for transmitting only control data through said digital interface, said control data representing one or more from among a plurality of system parameters associated with the at least encoded video data and one or more from among a plurality of predetermined values for each of said one or more of said selected plurality of system parameters, each of said selected values indicating updating of a system parameter by said reproducing device during operation of said decoding system to said respective receiving devices when updating of said parameter is requested from one of said receiving devices.

2. The data decoding system as claimed in claim 1, wherein said reproducing device and receiving devices are provided with a memory means respectively.

3. A data decoding method of a data decoding system comprising:
    a reproducing device for reproducing and transmitting from a single source at least encoded video data through a digital interface, and
    a plurality of receiving devices for receiving and decoding the data transmitted through said digital interface and for transmitting only control data through said digital interface, wherein said control data representing one or more from among a plurality of system parameters associated with the at least encoded video data and one or more from among a plurality of predetermined values for each of said one or more of said selected plurality of system parameters, each of said selected values indicates updating of a system parameter by said reproducing device during operation of said decoding system to said respective receiving devices when updating of said parameter is requested from one of said receiving devices.

4. A reproducing device for reproducing and transmitting from a single source at least encoded video data to a plurality of decoders through a digital interface, wherein, when updating of a system parameter is requested from one of said decoders via a transmission of only control data to said reproducing device, updating of said system parameter is performed by indicating in said control data a selection of selecting one or more from among a plurality of system parameters associated with the at least encoded video data, and one or more from among a plurality of predetermined values for each of said one or more of said selected plurality of system parameters, each of said selected values is indicated to said respective decoders for updating of a system parameter by said reproducing device during operation of said transmission device through said digital interface.

5. The reproducing device as claimed in claim 4, wherein said interface is an interface in accordance with the IEEE 1349 format.

6. The reproducing device as claimed in claim 5, wherein updating of said system parameter is indicated using asynchronous communication of said IEEE 1394.

7. The reproducing device as claimed in claim 5, wherein updating of said system parameter is indicated using isochronous communication of said IEEE 1394.

8. The reproducing device as claimed in claim 7, wherein data for indicating updating of said system parameter, when the data are transmitted by way of a MPEG2 format program stream using isochronous communication of said IEEE 1394, are stored in an area subsequent to the source packet header added to source packets which are formed by dividing said MPEG2 format program stream data into 8 fractions.

9. The reproducing device as claimed in claim 8, wherein said area is secured fixedly.

10. The reproducing device as claimed in claim 7, wherein data for indicating updating of said system parameter, when the data are transmitted by way of MPEG2 format transport stream using isochronous communication of said IEEE 1394, extends a packet identifier for indicating the data which indicates updating of said system parameter to the user area of packet identifier of said MPEG2 format transport stream data.

11. A reproducing device for reproducing and transmitting from a single source at least encoded video data to a plurality of decoders through a digital interface, wherein, when updating of a system parameter is requested from one of said decoders via a transmission of only control data to said reproducing device, updating of said system parameter is performed by indicating in said control data a selection of selecting one or more from among a plurality of system parameters associated with the at least encoded video data, and one or more from among a plurality of predetermined values for each of said one or more of said selected plurality of system parameters, each of said selected values is indicated to said respective decoders for updating of a system parameter by said reproducing device during operation of said transmission device through said digital interface.

12. The reproducing method as claimed in claim 11, wherein said interface is an interface in accordance with the IEEE 1394 format.

13. The reproducing method as claimed in claim 12, wherein updating of said system parameter is indicated using asynchronous communication of said IEEE 1394.

14. The reproducing method as claimed in claim 12, wherein updating of said system parameter is indicated using isochronous communication of said IEEE 1394.

15. The reproducing method as claimed in claim 14, wherein data for indicating updating of said system parameter, when the data are transmitted by way of a MPEG2 format program stream using isochronous communication of said IEEE 1394, are stored in an area subsequent to the source packet header added to source packets which are formed by dividing said MPEG2 format program stream data into 8 fractions.

16. The reproducing method as claimed in claim 15, wherein said area is secured fixedly.

17. The reproducing method as claimed in claim 14, wherein data for indicating updating of said system parameter, when the data are transmitted by way ofn a MPEG2 format transport stream using isochronous communication of said IEEE 1394, extends a packet identifier for indicating the data which indicates updating of said system parameter to the user area of packet identifier of said MPEG2 format transport stream data.

18. A receiving device of a data decoding system for receiving and decoding at least encoded data reproduced from a reproducing device and transmitted through a digital interface, comprising:
 a memory for storing a plurality of system parameters associated with the at least encoded video data,
 request means for requesting updating of one or more of said plurality of system parameters to the reproducing device side by transmitting only control data through said digital interface when updating of a system parameter is indicated, and
 updating means for updating said stored system parameter by selecting one or more from among a plurality of system parameters associated with the at least encoded video data, said control data representing from among a plurality of predetermined values for each of said one or more of said selected plurality of system parameters, each of said selected values updating a system parameter by said reproducing device during operation of said decoding system when updating of said system parameter associated with the at least encoded video data is indicated from said reproducing device through said digital interface.

19. The receiving device as claimed in claim 18, wherein said digital interface is an interface in accordance with the IEEE 1394 format.

20. The receiving device as claimed in claim 19, wherein said system parameter is transmitted using asynchronous communication of said IEEE 1394.

21. The receiving device as claimed in claim 19, wherein said system parameter is transmitted using isochronous communication of said IEEE 1394.

22. The receiving device as claimed in claim 19, wherein said data are data reproduced from a digital versatile disk.

23. The receiving device as claimed in claim 22, wherein said system parameter is at least any one of audio stream number, sub-picture stream number, and highlight button number.

24. A receiving method of a data decoding system for receiving and decoding the at least encoded video data reproduced from a reproducing device and transmitted through a digital interface, including:
 a storing step for storing a plurality of system parameters parameter associated with the at least encoded video data,
 a request step for requesting updating of one or more of said plurality of system parameters to the reproducing device side by transmitting only control data through said digital interface when updating of a system parameters is indicated, and
 an updating step for updating said stored system parameter by selecting one or more from among a plurality of system parameters, parameter associated with the at least encoded video data said control data representing from among a plurality of predetermined values for each of said one or more of said selected plurality of system parameters, each of said selected values updating a system parameter by said reproducing device during operation of said decoding system when updating of said system parameter associated with the at least encoded video data is indicated from said reproducing device through said digital interface.

25. The receiving method as claimed in claim 24, wherein said digital interface is an interface in accordance with the IEEE 1394 format.

26. The receiving method as claimed in claim 25, wherein said system parameter is transmitted using asynchronous communication of said IEEE 1394.

27. The receiving method as claimed in claim 25, wherein said system parameter is transmitted using isochronous communication of said IEEE 1394.

28. The receiving method as claimed in claim 25, wherein said data are data reproduced from a digital versatile disk.

29. The receiving method as claimed in claim 28, wherein said system parameter is at least any one of audio stream number, sub-picture stream number, and highlight button number.

* * * * *